United States Patent [19]

Schramm

[11] Patent Number: 5,079,103
[45] Date of Patent: Jan. 7, 1992

[54] FUEL CELLS WITH HYDROGEN RECYCLE

[75] Inventor: Walter Schramm, Munich, Fed. Rep. of Germany

[73] Assignee: Linde Aktiengesellschaft, Wiesbaden, Fed. Rep. of Germany

[21] Appl. No.: 514,459

[22] Filed: Apr. 25, 1990

[30] Foreign Application Priority Data

Apr. 25, 1989 [DE] Fed. Rep. of Germany ....... 3913581

[51] Int. Cl.$^5$ .............................................. H07M 8/06
[52] U.S. Cl. ........................................ 429/17; 429/19
[58] Field of Search ................................. 429/17, 19

[56] References Cited

U.S. PATENT DOCUMENTS

| | | | |
|---|---|---|---|
| 2,901,524 | 8/1959 | Gorin et al. | 429/17 |
| 2,926,753 | 3/1960 | Kohl et al. | 183/115 |
| 3,462,308 | 8/1969 | Winters | 429/17 |
| 4,037,024 | 7/1977 | Landau | 429/17 |
| 4,042,755 | 8/1977 | Anbar | 429/17 X |

FOREIGN PATENT DOCUMENTS

| | | |
|---|---|---|
| 3810113 | 10/1989 | Fed. Rep. of Germany . |
| 60-158559 | 8/1985 | Japan .................................. 429/17 |

OTHER PUBLICATIONS

Riquarts et al., "Linde Reports on Science and Technology: Gas Separation Using Pressure Swing Adsorption Plants", No. 40, 1985, pp. 26–35.

Linde, "Plants for the Production of Pure Hydrogen from Light Hydrocarbons", 1983.

Voss, "Status of Fuel Cell Development", Fuel Cell Workshop at Taormina/Sicily, Jun. 6, 1987, Comm. of the European Communities.

Primary Examiner—Stephen J. Kalafut
Attorney, Agent, or Firm—Millen, White & Zelano

[57] ABSTRACT

In high-temperature fuel cells, for example the solid oxide fuel cell (SOFC) and molten carbonate fuel cell (MCFC), anode waste gases containing hydrogen and carbon dioxide are separated from the waste gas stream by means of, e.g., a scrubbing step and/or an adsorption system, and the thus-obtained hydrogen is recycled to the anode. For the operation of an MCFC system, the carbon dioxide separated from the anode waste gas is reused by being admixed to the oxygen stream entering the cathode.

9 Claims, 1 Drawing Sheet

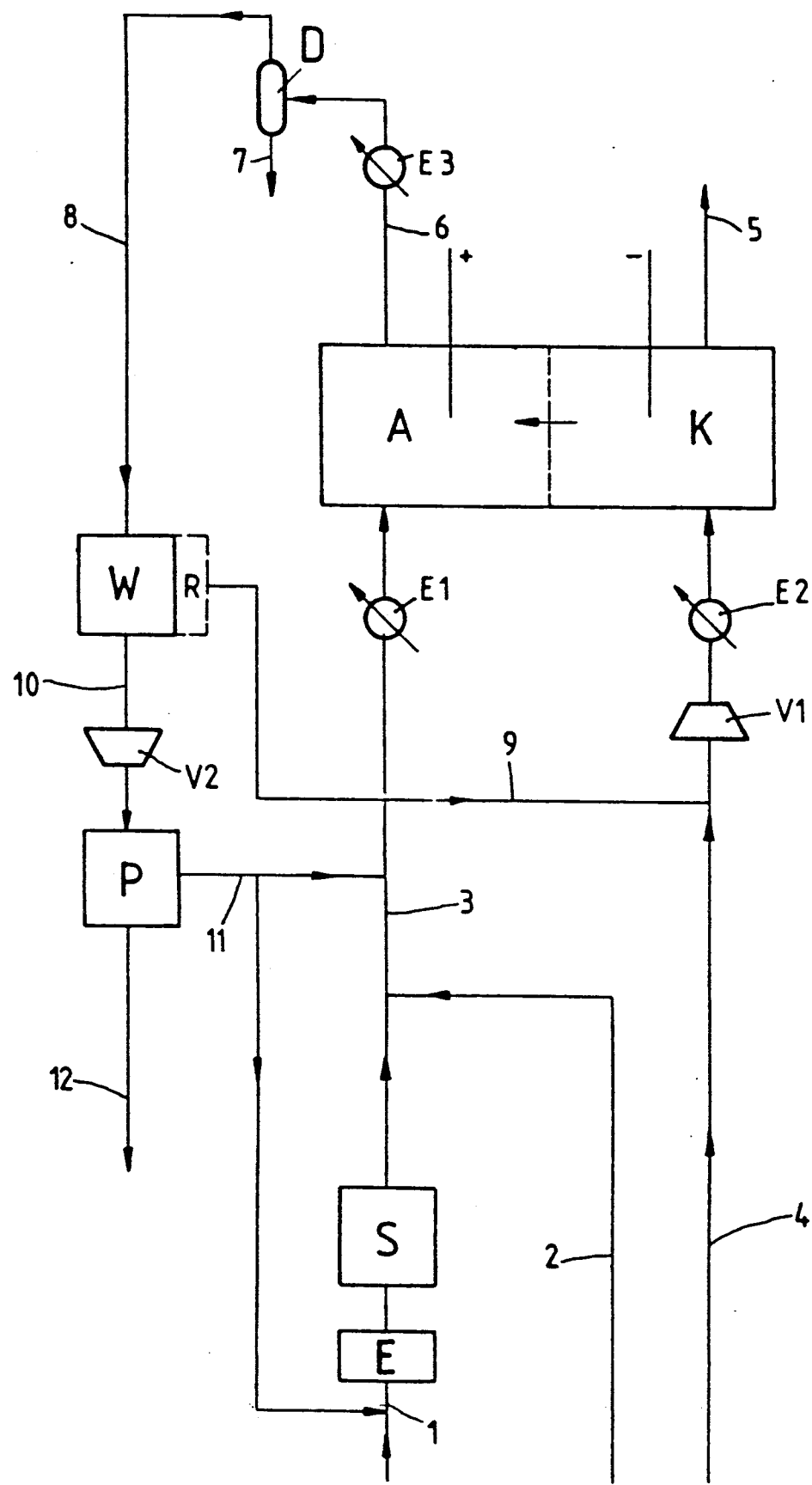

FUEL CELLS WITH HYDROGEN RECYCLE

CROSS-REFERENCE TO RELATED APPLICATION

This application is related to applicant's concurrently filed application entitled High-Temperature Fuel Cells with Oxygen-Enriched Gas of which applicant is a co-inventor along with Ulrich Hildebrandt, Ser. No. 514,462, filed Apr. 25, 1990.

BACKGROUND OF THE INVENTION

This invention relates to the operation of high-temperature fuel cells wherein oxygen supplied on the cathode side is converted into water and carbon dioxide with hydrogen and carbon monoxide at the anode with the generation of electrical power.

A method for the operation of fuel cells has been described in German Application P 38 10 113, wherein hydrogen and carbon monoxide are oxidized with oxygen for the production of electricity. In this conventional a steam reformer supplies the $H_2$— and CO-rich process, fuel gas while air is the source of oxygen. The conventional method is specifically concerned with the so-called molten carbonate fuel cell (MCFC) which contains a carbonate melt as the electrolyte. On the cathode side, this electrolyte, which conducts oxygen ions, is supplied with carbon dioxide and oxygen which are converted to $CO_3^{2-}$ ions at the cathode. The $CO_3^{2-}$ ions, diffusing through the electrolyte, are converted at the anode with hydrogen and carbon monoxide into water and carbon dioxide. The conversion of hydrogen at the anode with oxygen to water is, however, incomplete resulting in an anode containing residual hydrogen waste gas. The residual hydrogen in the anode waste gas is utilized in the undergrate firing of a synthesis gas generator wherein, in an endothermal reaction, hydrocarbons are converted to $H_2/CO$ synthesis gas. converte For use in the MCFC method, the carbon monoxide of the synthesis gas can be changed externally of the fuel cell by conversion to $CO_2$. In contrast thereto, with the use of an arrangement of a solid oxide type of fuel cell (SOFC), no such external conversion is required since the carbon monoxide is converted in the fuel cells proper, and the thus-formed carbon dioxide is exhausted with the anode waste gas. The SOFC cell is described for example in "Status of Fuel Cell Development" by E. Voss, presented at the Fuel Cell Workshop at Taormina/Sicily on June 6, 1987.

Another known type of cell concerns fuel cells with internal reforming. On the occasion of the "International Seminar, The Netherlands", from Oct. 26 to 29, 1987, K. Kishida et al. introduced a process with internal reforming, under the title of "Evaluation of Internal-Reforming Molten Carbonate Fuel cell for On-Site Application". Fuel cells with internal reforming are charged with chemically bound hydrogen, i.e., in the form of hydrocarbons. Thus, prepurified natural gas is utilized, for example, from which the fuel cells themselves produce the required hydrogen, utilizing the heat of conversion generated in the cell and the resultant steam. Excess hydrogen is also present in the anode waste gas in fuel cells of this type, so that the anode waste gas is frequently combusted to generate process steam.

The above mentioned uses of the anode waste gas, in one case for purposes of undergrate firing for the synthesis gas generator and, in another case, for the generation of process steam, generally do not efficiently utilize the hydrogen contained therein. Taking hydrogen for electrochemical oxidation in fuel cells will result in a conversion of 60 to 70% of its calorific value to electrical energy. In the generation of steam by the combustion of hydrogen only about 35% of the calorific value can be used.

SUMMARY OF THE INVENTION

One object of the present invention is to provide a novel process and an associated apparatus for improvement of the efficiency of utilization of the anode waste gas.

Upon further study of the specification and appended claims, further objects and advantages of this invention will become apparent to those skilled in the art.

To attain these objects, the anode waste gas containing hydrogen and carbon dioxide is, in at least one stage, processed and separated into component streams, of which at least one is recycled at least in part to the anode, and optionally a further portion is returned to the cathode.

The anode waste gas, containing hydrogen to a not incosiderable extent, e.g., 30% by volume, is processed and separated according to the method of this invention by suitable measures, wherein components usable for the fuel cell are recycled.

This holds true, in particular, for the hydrogen contained in the anode waste gas; this hydrogen is separated so that it can be efficiently utilized after being recycled to the anode, rather than serving, as heretofore, for low-quality power generation, for example. The recycling of hydrogen not consumed in the fuel cell results in an overall improved energy yield irrespective of the energy required in the processing of the anode waste gas.

It is especially advantageous to separate the hydrogen from the anode waste gas by means of pressure swing adsorption (PSA). Using PSA, the anode waste gas, which is preferably prepurified in a desulfurization step, is conducted under pressure over an adsorbent selective for components of the anode waste gas stream except for hydrogen. Once the adsorbent is loaded, it is regenerated by lowering the pressure, optionally enhanced by flushing with a purge gas that cannot be adsorbed. In order to ensure a supply of a constant stream of purified hydrogen to be recycled, two or more parallel-connected adsorbers are utilized, at least one of which is in each case in the adsorption mode.

In an advantageous embodiment of the invention, carbon dioxide is likewise separated from the anode waste gas and recycled to the cathode. This embodiment is provided for the operation of MCFC installations. As is known from the state of the art, carbon dioxide serves as a carrier for oxygen in the form of $CO_3^{2-}$ ions so that the oxygen can be transported through the molten carbonate to the anode where $CO_2$ molecules are reformed from the $CO_3^{2-}$ ions and are withdrawn with the hydrogen in the anode waste gas. Since the cathode of a fuel cell must be constantly supplied with carbon dioxide to account for internal consumption, it is advantageous to reduce the amount of externally supplied $CO_2$ by providing recycle $CO_2$ withdrawn from the anode waste gas.

In contrast, for operating an SOFC unit, no carbon dioxide recycling is needed so that the carbon dioxide is discarded together with the residual gas produced during hydrogen separation.

In a further development of the invention, the carbon dioxide is separated from the anode waste gas by means of pressure swing adsorption or a scrubbing step. Both separating methods are generally considered equivalent for removal of $CO_2$.

Thus, a PSA unit can serve simultaneously for obtaining hydrogen, being the unadsorbed component, and carbon dioxide, being the adsorbed component. In this process, the carbon dioxide is obtained during the regenerating stage for the adsorbent.

If carbon dioxide is separated from the anode waste gas by a scrubbing step, it is recommended to perform the scrubbing operation prior to the hydrogen separation by pressure swing adsorption. In this way, the hydrogen need merely be freed of components that have not been removed by the scrubbing step, leading to a reduction in the size of the adsorber unit. The use of a scrubbing step for carbon dioxide separation is therefore of special advantage in case of anode waste gases having a high $CO_2$ content, e.g., at least 37%, preferably at least 43% by volume. The carbon dioxide is absorbed by the scrubbing medium during the scrubbing step and is obtained during the regeneration of the loaded scrubbing medium.

Usage of the processing of the anode waste gas according to this invention is not restricted to MCFC and SOFC plants which are supplied with hydrogen fuel gas via a synthesis gas production unit; rather, this method can also be be utilized with advantage in fuel cell systems which receive hydrogen in a chemically bound form. These are systems with so-called internal reforming wherein the recycled hydrogen is admixed to the hydrocarbon feed stream and the carbon dioxide is optionally admixed to the oxygen feed stream.

BRIEF DESCRIPTION OF THE DRAWINGS

A preferred comprehensive embodiment of the invention is schematically set forth in the attached figure. For the sake of clarity, only one fuel cell is illustrated.

DETAILED DESCRIPTION OF THE DRAWING

A natural gas feed stream 1 is conducted to a conventional desulfurization unit E and a conventional synthesis gas production unit S, as described, e.g., in the Linde process description to "Plants for the production of pure hydrogen from light hydrocarbons", 1983, synthesis gas. After being heated up in heat exchanger E1 to the operating temperature of the of hydrogen only about 35% of the calorific value can be used. fuel cell, e.g., about 600°-700° C., the stream is fed to the anode side A. In this specific example, a fuel cell with molten carbonate is utilized wherein the oxygen for hydrogen conversion is transported in the form of $CO_3^{2-}$ ions. For this purpose, an oxygen feed stream 4, i.e., air or oxygen-enriched air, to which carbon dioxide has been added is compressed in compressor V1 to the operating pressure of the fuel cell, e.g., to about 5-12 bar and heated in heat exchanger E2 to the operating temperature whereafter it is introduced to the cathode side K of the fuel cell. $CO_3^{2-}$ ions are formed at the cathode and diffuse through the electrolyte to the anode where they are reacted with carbon monoxide and hydrogen to form carbon dioxide and water. Excess oxygen and carbon dioxide on the cathode side are removed together with the cathode waste gas 5.

On the anode side, an anode waste gas 6 is withdrawn which contains, besides hydrogen, carbon dioxide and water, additional components, e.g., those introduced with the hydrogen feed stream. After the anode waste gas has been cooled off in heat exchanger E3, the water is separated in separator D and discharged at 7. The anode waste gas 8, extensively freed of water, is subjected to a conventional scrubbing stage W for the separation of carbon dioxide, as described for example in U.S. Pat. No. 2,926,753.

The scrubbed hydrogen-containing gas 10 is separated, after previously being compressed to about 8 bar in compressor V2, by means of a conventional pressure swing adsorption system P as described, e.g., in LINDE Reports on Science and Technology, "Gas Separation Using Pressure Swing Adsorption Plans", Vol. 40, 1985, pp. 26-35, into a hydrogen stream 11 and a residual gas 12. The resultant hydrogen stream 11 is divided into two component streams, one of which, e.g., about 3 to 5%, is added to the natural gas feed stream 1 to be reformed and the other, e.g., 95-97%, is added to the hydrogen synthesis gas 3. Admixing can, however, be selectively carried out also entirely prior to the desulfurization stage E. Recycling all of the hydrogen back to the desulfurization unit results in a simplification of the process. It ensures that always enough hydrogen is present for the removal of sulphur compounds, even when substantial and rapid changes in the power demand occur. Those changes are induced, e.g. by peak loads of the electricity consumption at certain times. Any lack of hydrogen in the desulfurization unit leads to an incomplete conversion of the sulphur compounds, the latter being harmfull to the steam reforming catalyst, which can be poisoned by trace amounts in the range of few ppm.

Regeneration R of the scrubbing liquid from scrubbing stage W is conducted in a conventional regeneration system R, as described, e.g., in U.S. Pat. No. 2,926,753. The resultant regenerated carbon dioxide stream 9 operation is advantageously admixed to the oxygen feed stream 4 prior to compression V1, and returned to the cathode side.

For the operation of an SOFC system, there would be no admixture of fraction 9 to the oxygen feed stream.

Likewise, in case of cells with internal reforming, the synthesis gas production unit S can be omitted. The steam 2 as well as the hydrogen recycle stream 11 would be admixed to the natural gas feed stream 1 and, after the latter has been heated up to fuel cell operating temperature, would be passed to the anode side A.

By means of the arrangement according to this invention in correspondence with the figure, it is possible to attain an overall degree of efficiency of the system of about 70%.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

The entire disclosures of all applications, patents and publications, cited above, and of corresponding application Federal Republic of Germany P 39 13 581.0 filed Apr. 25, 1989, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. Apparatus comprising high temperature fuel cell means containing an anode chamber, a cathode chamber, and a molten carbonate electrolyte; $CO_2$ separation means comprising scrubbing means in communication with said anode chamber; pressure increasing means for increasing the pressure of a separated component stream from said scrubbing means; recycle conduit means in communication with said pressure increasing means and said cathode chamber so as to permit gas from said pressure increasing means to be recycled to said cathode chamber; hydrogen separation means comprising pressure swing adsorption means in communication with said scrubbing means to separate hydrogen from residual gas withdrawn from said scrubbing means, desulfurization means upstream of said anode for desulfurizing natural gas, used as a source of hydrogen for said anode chamber; and conduit means from said hydrogen separation means into said desulfurization means for passing resultant separated hydrogen into said desulfurizing means.

2. Apparatus according to claim 1, further comprising $H_2O$ cooling and condensing means communicating between said anode chamber and said scrubbing means.

3. In a method of operating a molten carbonate fuel cell wherein oxygen supplied on the cathode side is reacted with hydrogen fuel, wherein at least a part of said hydrogen fuel is supplied to the anode as a natural gas to form water at the anode, with generation of power and with the formation of an anode waste gas containing hydrogen and carbon dioxide; processing and separating said anode waste gas into (a) a stream consisting essentially of $CO_2$, said $CO_2$ being separated from other components in the anode waste gas by a scrubbing liquid, and (b) a stream consisting essentially of hydrogen, said hydrogen being separated from other components in the anode waste gas by pressure swing adsorption; recycling resultant stream (b) consisting essentially of hydrogen at least in part to the anode; and recycling resultant $CO_2$ stream (a) consisting essentially of $CO_2$ to the cathode; the improvement which comprises desulfurizing said natural gas in a desulfurization stage upstream of said anode and passing at least a portion of said resultant stream (b) consisting essentially of hydrogen through said desulfurization stage.

4. A method according to claim 3, wherein all of said resultant stream (b) consisting essentially of hydrogen is passed through said desulfurization stage.

5. A method according to claim 3, further comprising a stage of cooling said anode waste gas to condense and remove $H_2O$ therefrom, prior to said stage of processing and 6. A method according to claim 3, wherein the anode waste gas contains at least 37% $CO_2$ by volume, and residual gas from the scrubbing is passed to a pressure swing adsorption stage to form said stream consisting essentially of hydrogen.

7. In a method of operating a molten carbonate fuel cell wherein oxygen supplied on the cathode side is reacted with hydrogen fuel, wherein at least a part of said hydrogen fuel is supplied to the anode as a natural gas to form water at the anode, with generation of power and with the formation of an anode waste gas containing hydrogen and carbon dioxide; processing and separating said anode waste gas into (a) a stream consisting essentially of $CO_2$, said $CO_2$ being separated from other components in the anode waste gas by a scrubbing liquid, and (b) a stream consisting essentially of hydrogen, said hydrogen being separated from other components in the anode waste gas by pressure swing adsorption; recycling resultant stream (b) consisting essentially of hydrogen at least in part to the anode; and recycling resultant $CO_2$ stream (a) consisting essentially of $CO_2$ to the cathode, the improvement comprising desulfurizing said natural gas in a desulfurization stage and passing resultant desulfurized natural gas to a synthesis gas stage for the production of hydrogen fuel prior to passing said fuel to the anode, branching said resulting hydrogen stream (a) into a minor stream and a major stream, passing said minor stream into the natural gas upstream of the desulfurization stage, and passing said major stream downstream of said synthesis gas stage into the anode.

8. A process according to claim 7, wherein said minor stream constitutes 3–5%, and said major stream constitutes 95–97% of said resultant hydrogen stream (a).

9. A method according to claim 7, further comprising a stage of cooling said anode waste gas to condense and remove $H_2O$ therefrom, prior to said stage of processing and separating said anode waste gas into said stream (b) consisting essentially of hydrogen and said stream (a) consisting essentially of $CO_2$.

* * * * *